April 8, 1941.   E. H. LAND   2,237,565
APPARATUS FOR USE IN ANTIGLARE DEVICES EMPLOYING POLARIZED LIGHT
Filed Dec. 15, 1937

INVENTOR.
Edwin H. Land
BY Brown & Jones
ATTORNEYS.

Patented Apr. 8, 1941

2,237,565

UNITED STATES PATENT OFFICE 2,237,565

APPARATUS FOR USE IN ANTIGLARE DEVICES EMPLOYING POLARIZED LIGHT

Edwin H. Land, Wellesley Farms, Mass., assignor, by mesne assignments, to Polaroid Corporation, Dover, Del., a corporation of Delaware Application December 15, 1937, Serial No. 179,833

7 Claims. (Cl. 88—65)

This invention relates to a new and improved device for use in connection with optical systems employing polarized light in the elimination of automobile headlight glare.

It has heretofore been suggested that polarized light be employed in the elimination of automobile glare, and to this end it has been suggested that the headlights of motor vehicles be equipped with means for polarizing in a predetermined manner the beams emanating therefrom, and that the windshields of said vehicles be equipped with analyzing means, or that supplemental viewing screens be provided adjacent the windshields or in the form of viewing glasses, said analyzing means and viewing screens comprising cooperative polarizers adapted to block the light emanating from the headlights of an approaching car.

It has been found that the plastic sheets or films now universally employed in the production of the so-called shatter-proof windshield glass used widely in the automotive industry are to an extent birefringent, and that the birefringence of these plastic sheets or layers differs slightly with the product of different manufacturers of the sheeting and hence in the automobiles to which the shatter-proof glass is applied. So also case-hardened windshields show, frequently, regular strain patterns in polarized light, due to birefringence introduced into the material by the case hardening process.

This birefringence acts to alter the polarization characteristics of the headlight beam traversing the windshield, and as a result the viewing visor or analyzer provided to cut off or reduce the intensity of the said beam fails to function fully in the manner for which it is intended.

It is an object of this invention to provide, in connection with the polarizing viewing screens or visors which have been suggested for use in connection with the elimination of headlight glare in systems employing polarized light, a compensating birefringent sheet, and to provide such sheet with its optic axes so positioned with respect to the polarizing axis of the analyzer and the optic axes of the birefringent plastic in the shatter-proof glass windshield that the birefringence of the said plastic sheet in the windshield is either offset or supplemented so that the polarizing sheet may function fully.

A further object of the invention is to provide such a supplemental birefringent sheet as a separate element for use in connection with the polarizing visor.

A still further object of the invention is to provide a unitary structure in the form of a polarizing viewing screen and supplemental birefringent sheet which may be utilized together as an analyzer or viewing device.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the nature and objects of the invention reference should be had to the following detailed description taken in connection with the accompanying drawing, in which.

Several types of viewing screens have been suggested in connection with the elimination of automobile headlight glare in systems employing polarized light. It has been suggested, for example, that a supplemental viewing visor in the form of a drop-flap be provided which may be mounted behind but adjacent the windshield. Such a flap may be raised during daytime driving and lowered at night to introduce between the eyes of the driver and his field of view a polarizing screen adapted to block from the driver's eyes the polarized beams from the headlights of approaching cars. It has also been suggested that the polarizing analyzer or blocking screen be incorporated directly into the windshield by building up for example a lamination of the plastic ordinarily employed in windshield construction and a film or sheet of the polarizing material with the plastic on each side of the polarizing film or sheet. It will be apparent that in either of these systems a layer of plastic within the windshield itself will remain between the light-polarizing sheet or film and the light source which that sheet is intended to analyze, i. e., the headlights of an approaching car.

It has been found that the plastic films or sheets employed in the lamination of glass and in the formation of the so-called shatter-proof windshields are frequently birefringent, the degree of birefringence of the sheets depending upon the method of manufacture of the plastic sheet, its thickness, and other conditions.

While the birefringence of the different types of plastic sheets varies to some extent, it has been found possible to classify the sheets into groups, the birefringence of the sheets in each group being closely similar.

When sheets of the type described are introduced between a polarizing headlight and a viewing visor positioned with its polarizing axis to block the beams emitted from the headlight, the plastic sheet may cause an increase in the apparent brightness of the polarized beam, so that the viewing visor no longer functions in the manner intended to block that beam.

It is quite possible to provide as a supplement to the viewing visor an additional birefringent sheet, for example, a sheet of the material forming the birefringent layer in the windshield itself, and so to position this supplemental birefringent sheet that it acts to offset or supplement the birefringence of the plastic within the windshield, so that the sum of the relative retardations in the two sheets is nil, or is a useful quantity, such as a half-wave or quarter-wave.

Figure 1:
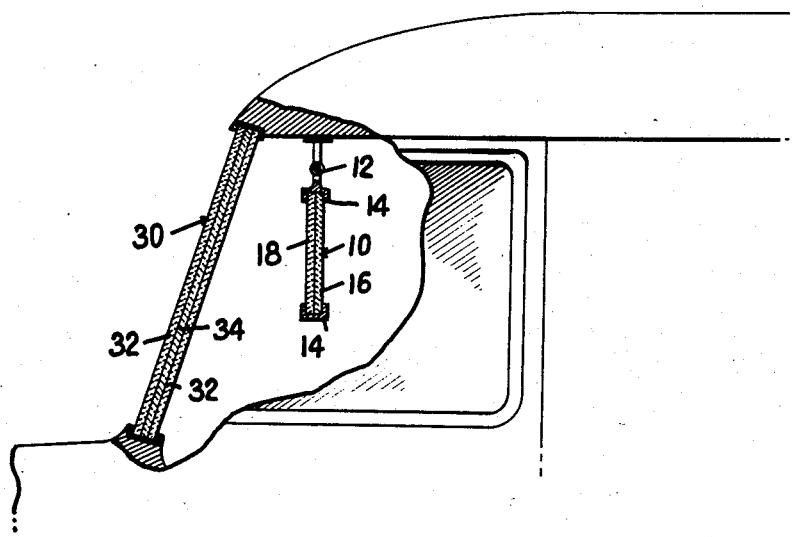
Figure 1 is a view in section showing one form of the invention.

This invention contemplates the provision with a suitable polarizing viewing screen of a supplemental or offsetting birefringent film or sheet of the type described. One modification of the invention is shown in Fig. 1, wherein the viewing visor 10 is shown as a drop-flap type of visor provided at 12 with mounting means so that it may be affixed to the car body adjacent the windshield 30, which is shown as comprising the two sheets of glass 32 and the plastic, birefringent sheet 34. The visor itself comprises a frame 14 within which there may be positioned a light-polarizing sheet 16, for example a sheet of the material sold commercially under the trade-name "Polaroid," with its polarizing axis positioned to block the polarized beams emanating from the headlights of an approaching car. Adjacent this light-polarizing sheet and between it and the headlights of the approaching car, and preferably affixed to the polarizing sheet, as for example by cementing thereto or otherwise bonding thereto, is a doubly refractive sheet 18 having such birefringence and with its optical axes so positioned with respect to the polarizing axis of the sheet 16 and with respect to the optical axes of the birefringent plastic layer in the windshield of the car as to offset the birefringence of that layer. The sheet 18 may comprise a set sheet of plastic material, such for example as a cellulosic material of the type of cellulose acetate or ethyl cellulose, or a synthetic resin, such as a vinyl compound, or Cellophane, or any other birefringent sheet. The sheet should preferably be neither dichroic nor highly absorbing.

It will be apparent that with a device such as is shown in Fig. 1 the driver of a vehicle will see the headlights of an approaching car to the same degree and in the same manner as though there were no birefringent material interposed between the viewing screen and the approaching headlights, i. e., the polarizing axis of the viewing screen may be positioned in its desired relation to the polarizing axis of the headlight of the approaching car without consideration of the birefringence of the intervening windshield.

Figure 2:
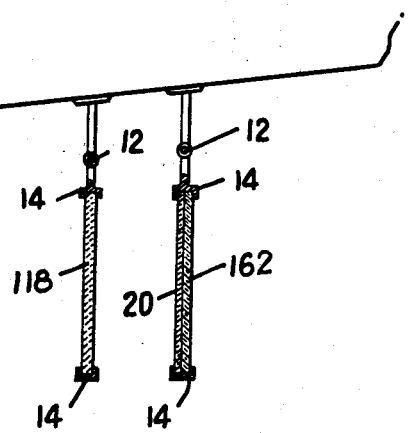
Fig. 2 is a view in section showing a modification of the invention.

In Fig. 2 a modification of the invention is shown wherein the polarizer 162 and the neutralizing birefringent sheet 118 are separately mounted for cooperative action in connection with the elimination of glare from the headlights of an approaching car. Here there is shown associated with the polarizing sheet 162 a quarter-wave retardation sheet 20 so positioned with respect to the polarizer as to make the analyzing screen adapted to block circularly polarized light. It will be apparent that the device of Fig. 1 may be modified, by the incorporation of a quarter-wave sheet between the elements 18 and 16, so as to act as an analyzer for circularly polarized light, and the device of Fig. 2 may be changed to an analyzer for plane polarized light by the omission of the element 20.

Figure 3:
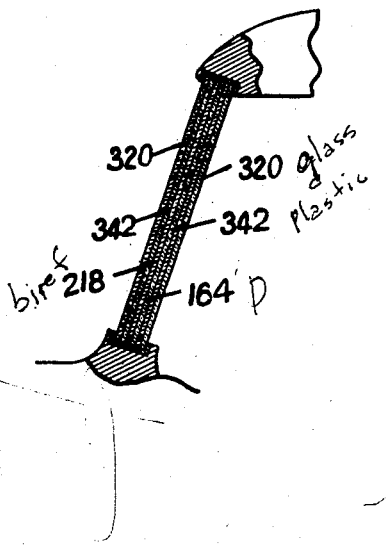
Fig. 3 is a similar view showing a still further modification of the invention.

It will be obvious, where the polarizing analyzer is introduced directly into the windshield of the car, as shown in Fig. 3 and between the glass cover elements 320, that before it is bonded to the plastic 342 forming the shatter-proof film, an offsetting birefringent plastic layer 218 may be affixed to the polarizing sheet 164 on the surface thereof nearer the headlights of an approaching car, so that when the lamination is completed the birefringence of the cementing layer of plastic will be offset.

It is to be understood that it may be desirable, instead of offsetting the birefringence of the windshield, to supplement that birefringence so as to utilize it; for example, it may be desirable to effect a 90° rotation of the direction of vibration of the headlight beam and this may be accomplished by employing as the supplemental birefringent layer or element material having such birefringence that the headlight beam is rotated the desired amount by passage through the windshield and the supplemental element. Such a device and similar structures are to be deemed within the invention.

It will be obvious that the invention herein described may be applied with equal effect to automotive vehicles and systems for headlight glare elimination employing circularly or elliptically polarized light and to systems employing plane polarized light.

Furthermore, it is to be understood that the invention is applicable to structures and devices wherein the undesired birefringence may be introduced into the system in some other way than by means of the birefringent plastic layer in a windshield. For example, in case-hardened windshields birefringence may be introduced directly into the glass itself, and may frequently appear as a regular pattern in polarized light. In such cases the supplemental birefringent element may be made to conform to the pattern in the windshield and to function in the manner previously described.

It is contemplated that a series of, for example, several different types of windshield flaps or viewing screens, is to be provided, in each of which the birefringence of the offsetting birefringent layer differs slightly to provide for the difference in birefringence of the commercial shatter-proof materials now on the market. With such a series of viewing screens it will be readily apparent to any mechanic attaching the screen to the car which of the series is to be employed with the windshield with which the analyzer is to be associated.

The words "birefringence" and "birefringent means" as used throughout this specification and claims are to be interpreted in the usual way and are not to be understood as including a structure adapted substantially to block plane-polarized light.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In a viewing device for use in automotive vehicles and the like equipped with a windshield comprising birefringent means, in combination, means comprising a light polarizing element and a second birefringent means interposed between the windshield and the polarizing element, the sum of the birefringence of the birefringent means of said windshield and said second birefringent means imparting to a beam of polarized light traversing said birefringent means in a direction substantially parallel to the roadway upon which said automotive vehicle rests, a retardation of $$\frac{n}{4}$$

wave lengths, $n$ being $0, 1, 2, 3 \ldots$, and mounting means for positioning said light-polarizing element and said second birefringent means between the windshield and the driver of the vehicle.

2. In a viewing device for use in automotive vehicles and the like equipped with a windshield comprising birefringent means, in combination, means comprising a light polarizing element and a second birefringent means comprising a birefringent plastic bonded to said light-polarizing element and interposed between the windshield and the polarizing element, the sum of the birefringence of the birefringent means of said windshield and said second birefringent means imparting to a beam of polarized light traversing said birefringent means in a direction substantially parallel to the roadway upon which said automotive vehicle rests a retardation of $$\frac{n}{4}$$

wave lengths, $n$ being $0, 1, 2, 3 \ldots$, and mounting means for positioning said light-polarizing element and said second birefringent means between the windshield and the driver of the vehicle.

3. A viewing device for use in automotive vehicles and the like equipped with a windshield comprising a birefringent layer, in combination, means comprising a light polarizing element and a second birefringent layer interposed between the birefringent layer of said windshield and said polarizing element, the sum of the birefringence of said layers imparting to a beam of polarized light traversing both of said birefringent layers in a direction substantially parallel to the roadway upon which the vehicle rests a retardation of $$\frac{n}{4}$$

wave lengths, where $n$ is $0, 1, 2, 3, \ldots$

4. A viewing device for use in automotive vehicles and the like equipped with a windshield comprising a birefringent layer, in combination, means comprising a light polarizing element and a second birefringent layer interposed between the birefringent layer of said windshield and said polarizing element, the sum of the birefringence of said second layer and the birefringence of said first mentioned layer imparting to a beam of polarized light traversing said first-mentioned birefringent layer and said second-mentioned birefringent layer in a direction substantially parallel to the surface of the road upon which said vehicle rests a retardation of $n$ wave lengths, where $n$ is $0, 1, 2, 3, \ldots$ 5. In an automotive vehicle, in combination, a windshield comprising a transparent layer showing birefringence, a light-polarizing element positioned between the birefringent layer of said windshield and the driver of said vehicle, and a second birefringent element substantially coextensive with and overlying said light-polarizing element and positioned between said light-polarizing element and the birefringent layer of said windshield, the birefringence of said birefringent elements imparting to a beam of plane-polarized light transmitted by said two elements a retardation of $n$ wave lengths, where $n$ is $0, 1, 2, 3 \ldots$ 6. In an automotive vehicle, in combination, a windshield comprising a transparent layer showing birefringence, a light-polarizing element positioned between the birefringent layer of said windshield and the driver of said vehicle, and a second birefringent element substantially coextensive with and overlying said light-polarizing element and positioned between said light-polarizing element and the birefringent layer of said windshield, the combined birefringence of said two birefringent elements imparting substantially no relative retardation to any component of a transmitted beam.

7. A device for use in connection with vehicles employing polarized light for the elimination of glare and equipped with windshields showing undesired birefringence comprising, in combination, an analyzer positioned to block polarized light incident on said windshield and mounted between said windshield and the driver of said vehicle, and a birefringent element positioned to intercept light traversing said windshield and said analyzer and positioned between said windshield and said analyzer, the combined birefringence of said birefringent elements imparting to a beam of plane-polarized light traversing said elements in a direction substantially parallel to the roadway upon which said vehicle rests a retardation of $n$ wave lengths, where $n$ is $0, 1, 2, 3, \ldots$

EDWIN H. LAND.